Dec. 19, 1939.  R. H. SAVAGE  2,183,975
CANE
Filed Oct. 4, 1938
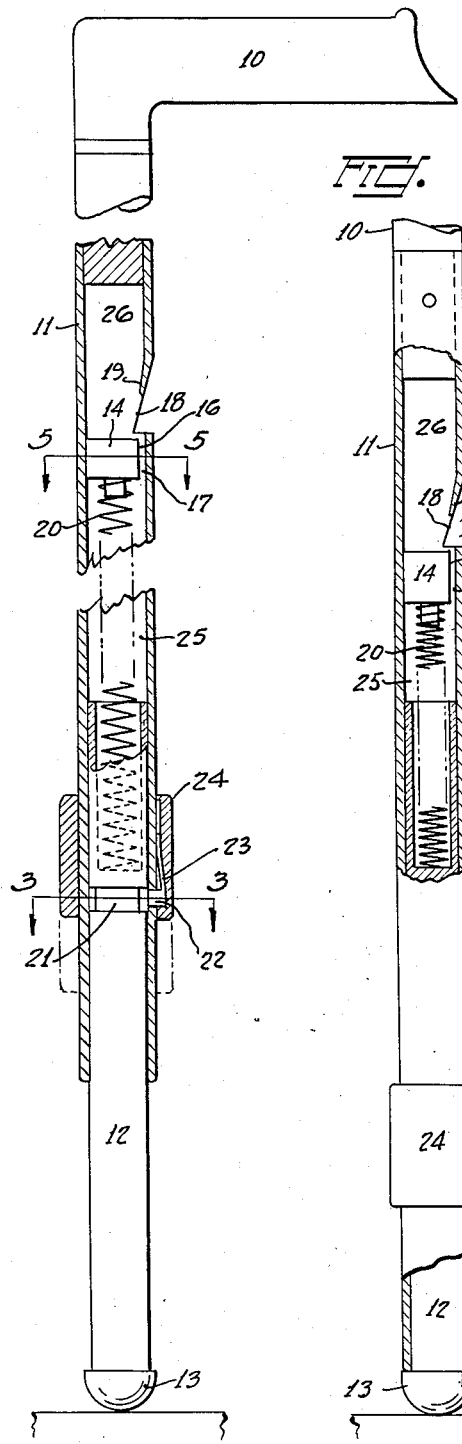
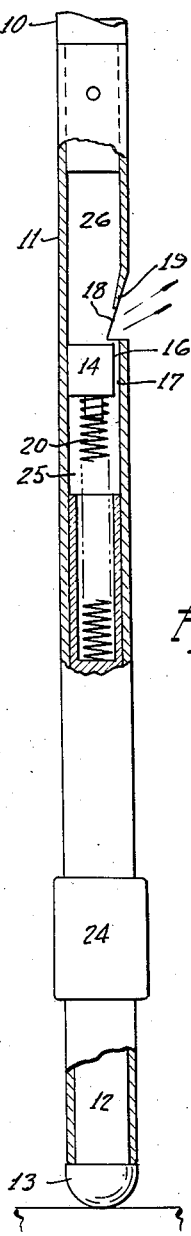
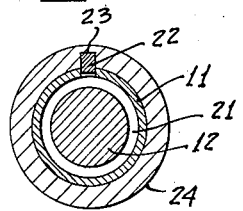
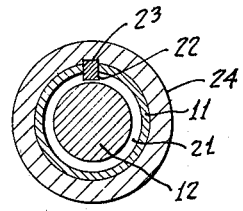
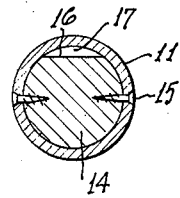
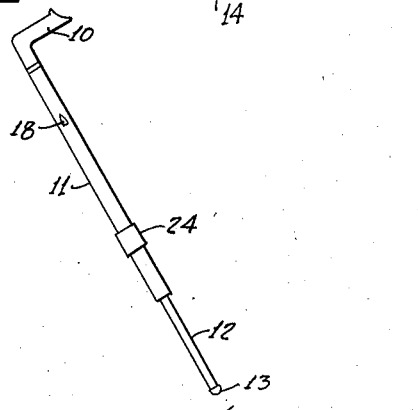
INVENTOR
R. H. SAVAGE
BY C. B. Birkenbeuel
ATTORNEY Patented Dec. 19, 1939

2,183,975

UNITED STATES PATENT OFFICE 2,183,975

CANE

Robert H. Savage, Salem, Oreg.

Application October 4, 1938, Serial No. 233,260

2 Claims. (Cl. 135—47)

This invention relates generally to canes, and particularly to a whistling cane.

The main object of this invention is to construct a cane having a whistle incorporated therein and to provide a means for operating the whistle by pressing the cane against the ground.

The second object is to construct a novelty especially adapted for fairs and carnivals.

I accomplish these and other objects in the manner set forth in the following specification as illustrated in the accompanying drawing, in which:

Fig. 1 is a longitudinal section through the cane with portions thereof broken away for shortening purposes showing the cane in an extended position.

Fig. 2 is a fragmentary view similar to Fig. 1 but showing the cane in a compressed or whistling condition.

Fig. 3 is a section taken along the line 3—3 in Fig. 1.

Fig. 4 is a view similar to Fig. 3 but showing the parts locked to prevent whistling.

Fig. 5 is a section taken along the line 5—5 in Fig. 1.

Fig. 6 is an elevation of the cane.

Similar numerals refer to similar parts throughout the several views.

Referring in detail to the drawing, there is shown a common form of handle 10 to which is attached a tubular body 11 in whose lower end is slidably mounted a stem 12 having a ground engaging tip 13 secured thereto. Within the tubular body 11 is secured a plug 14 by means of the screws 15. The plug 14 has a flattened face 16 which provides a passageway 17 for the passage of air from the under side of the plug 14 to the upper side thereof.

The body 11 has a cut-out portion 18 just above the plug 14. It is desirable to turn the lip 19 inwardly as shown to improve the whistling action. A spring 20 is interposed between the plug 14 and the slidable stem 12.

The stem 12 is provided with an encircling groove 21 adapted to receive the end 22 of a spring latch 23. A slidable sleeve 24 is placed around the body 11 and is adapted to compress the latch 23 so that its end 22 will enter the groove 21.

The operation of the device is as follows:

When a cane is to be used as an ordinary walking stick, the sleeve 24 is moved to the position shown in dotted lines in Fig. 1, but when it is to be used for whistling purposes, it is raised as shown in full lines in Fig. 1.

If the user presses the cane tip 13 against the ground, it will cause the air to be expelled from the chamber 25 into the chamber 26 and to issue from the opening formed by the cut-out portion 18 with a whistling sound, the nature of which will depend upon the diameter and length of the chamber 26, the material from which it is made and the speed of the movement.

It must be understood that while I have thus illustrated and described my invention, it is not my intention to be limited to the precise form shown in the drawing, but I do intend to cover all such forms and modifications thereof as fall fairly within the appended claims.

I claim:

1. The combination of a walking cane having a whistle incorporated therein, an air pump forming a part of said cane, a ground engaging tip for said cane adapted to operate said pump when said tip is pressed against the ground and means for selectively rendering said tip inoperative.

2. A walking cane having a tubular body constituting a whistle, said body having a handle at one end thereof and a slidable piston at the other end thereof, said slidable piston constituting a ground engaging tip, a spring for urging said tip to an outermost position and means for selectively locking said piston against movement.

ROBERT H. SAVAGE.